United States Patent
Ge et al.

(10) Patent No.: US 12,400,129 B2
(45) Date of Patent: Aug. 26, 2025

(54) METHOD OF KNOWLEDGE SHARING AMONG DIALOGUE SYSTEMS, DIALOGUE METHOD AND DEVICE

(71) Applicant: AI Speech Co., Ltd., Jiangsu (CN)

(72) Inventors: Fujiang Ge, Jiangsu (CN); Min Chu, Jiangsu (CN); Taotao Guo, Jiangsu (CN); Zhongyuan Dai, Jiangsu (CN)

(73) Assignee: AI Speech Co., Ltd., Jiangsu (CN)

( * ) Notice: Subject to any disclaimer, the term of this patent is extended or adjusted under 35 U.S.C. 154(b) by 1242 days.

(21) Appl. No.: 17/057,722

(22) PCT Filed: May 21, 2019

(86) PCT No.: PCT/CN2019/087808
§ 371 (c)(1),
(2) Date: Nov. 23, 2020

(87) PCT Pub. No.: WO2019/228232
PCT Pub. Date: Dec. 5, 2019

(65) Prior Publication Data
US 2021/0201167 A1    Jul. 1, 2021

(30) Foreign Application Priority Data
May 30, 2018  (CN) .......................... 201810536554.1

(51) Int. Cl.
*G06N 5/022* (2023.01)
*G06F 40/205* (2020.01)
(Continued)

(52) U.S. Cl.
CPC ............ *G06N 5/022* (2013.01); *G06F 40/205* (2020.01); *G06N 5/04* (2013.01); *H04L 51/02* (2013.01)

(58) Field of Classification Search
CPC ........ G06N 5/022; G06N 20/00; G06N 3/045; G06N 3/044; G06N 3/047; G06N 5/04;
(Continued)

(56) References Cited

U.S. PATENT DOCUMENTS 6,499,024 B1   12/2002  Stier et al.
2004/0054636 A1*  3/2004  Tango-Lowy ......... G06N 3/088
                                                     706/15
(Continued)

FOREIGN PATENT DOCUMENTS

CN    101437018 A    5/2009
CN    102667765 A    9/2012
(Continued)

OTHER PUBLICATIONS

"The Octopus Approach to the Alexa Competition: A Deep Ensemble-based Socialbot" Serban et al (Year: 2017).*
(Continued)

*Primary Examiner* — Luis A Sitiriche
(74) *Attorney, Agent, or Firm* — Sisson & Banyas, Attorneys at Law, LLC; Jeffrey J. Banyas (57) ABSTRACT

The present application discloses a method of knowledge sharing between dialogue systems, including: receiving, by a first dialogue system, a knowledge sharing request sent by an external dialogue system, wherein the knowledge sharing request comprises at least feature information of a knowledge point to be shared by the external dialogue system; parsing the knowledge sharing request to determine the feature information of the knowledge point to be shared; and adding the feature information of the knowledge point to be shared to a knowledge base of the first dialogue system to form a shared knowledge base. The embodiment of the present application realizes the sharing of knowledge among different dialogue systems by sharing knowledge points
(Continued)

among dialogue systems, and meets the cross-domain dialogue needs of users for dialogue robots to the greatest extent while minimizing costs.

12 Claims, 4 Drawing Sheets

(51) Int. Cl.
    *G06N 5/04*        (2023.01)
    *H04L 51/02*      (2022.01)

(58) Field of Classification Search
    CPC  G06N 3/08; G06N 3/04; G06N 3/006; G06N 3/048; G06N 3/084; G06N 5/01; G06N 5/02; G06N 3/082; G06N 7/01; G06N 20/10; G06N 5/00; G06N 3/088; G06N 3/0464; G06N 20/20; G06N 3/0442; G06N 5/045; G06N 3/042; G06N 3/09; G06N 5/041; G10L 15/1822; G10L 15/22; G10L 15/1815; G10L 2015/223; G10L 13/00; G10L 15/063; G10L 15/07; G10L 15/16; G10L 2015/227; G10L 15/08; G10L 15/30; G10L 15/32; G10L 2015/0631; G10L 2015/088; G10L 2015/228; G10L 15/26; G10L 15/18; G10L 13/04; G10L 15/02; G10L 15/183; G10L 15/187; G10L 15/19; G10L 17/06; G10L 17/22; G10L 2015/225; G06V 10/764; G06V 10/82; G06V 10/255; G06V 20/00; G06V 20/20; G06V 20/30; G06V 20/41; G06V 2201/10; G06V 40/16; G06V 40/174; G06V 40/25; G06V 20/10; G06V 40/28; G06Q 50/01; G06Q 10/00; G06Q 10/109; G06Q 10/1095; G06Q 30/016; G06Q 30/0603; G06Q 30/0631; G06Q 30/0633; G06Q 30/0643; G06Q 10/06311; G06Q 10/1053; G06Q 10/107; G06Q 30/01

See application file for complete search history.

(56) References Cited

U.S. PATENT DOCUMENTS

| | | | |
|---|---|---|---|
| 2008/0294701 A1* | 11/2008 | Saraswati | G06F 16/273 707/999.203 |
| 2009/0089126 A1* | 4/2009 | Odubiyi | G06Q 10/06393 704/9 |
| 2013/0077775 A1 | 3/2013 | Fan et al. | |
| 2017/0068551 A1* | 3/2017 | Vadodaria | G06Q 10/107 |
| 2018/0025726 A1 | 1/2018 | Gatti de Bayser et al. | |

FOREIGN PATENT DOCUMENTS

| | | |
|---|---|---|
| CN | 103493045 A | 1/2014 |
| CN | 105592082 A | 5/2016 |
| CN | 106663130 A | 5/2017 |
| CN | 106844506 A | 6/2017 |
| CN | 107767253 A | 3/2018 |
| CN | 108763494 A | 11/2018 |
| JP | 10031637 A | 2/1998 |
| JP | 2004-295484 A | 10/2004 |
| JP | 2005-108067 A | 4/2005 |
| JP | 2006-085283 A | 3/2006 |
| JP | 2012-068742 A | 4/2012 |
| JP | 2012-248161 A | 12/2012 |
| WO | 2002/099695 A1 | 12/2002 |

OTHER PUBLICATIONS

Matsuo, Masato, Notice of Reasons for Refusal, Office Action of Japanese Patent Application No. 2020-565948, Jul. 6, 2021, Japan Patent Office, Tokkyocho Japan.

Matsuo, Masato, "Notice of Reasons for Refusal—Japanese Patent Application No. 2020-565948", Dec. 23, 2021, Patent Office of Japan.

Theissing, Simon, "Supplementary European Search Report—European Patent Application No. EP 19 81 1963", Feb. 23, 2022, European Patent Office.

Hussain et al., "Extending a Conventional Chatbot Knowledge Base to External Knowledge Source and Introducing User Based Sessions for Diabetes Education", 2018 32nd International Conference on Advanced Information Networking and Applications Workshops (Waina), May 16, 2018, pp. 698 to 703.

Dingli et al., "Building a Hybrid: Chatterbot—Dialog System", Advances in Biometrics: International Conference, ICB 2007, Sep. 1, 2013, pp. 145 to 152, Springer, Berlin, Heidelberg.

Hermjakob et al., "Knowledge-Based Question Answering", Jul. 14, 2002, pp. 1 to 6.

EP19811963.8—Communication pursuant to Art 94(3) EPC (First OA), Dec. 15, 2022, all pages.

EP19811963.8—Communication pursuant to Art 94(3) EPC (Second OA), Jun. 30, 2023, all pages.

EP19811963.8—Communication pursuant to Art 94(3) EPC (Third OA), Oct. 30, 2024, all pages.

JP2022-113679—Decision of Refusal (Original), JPO, Jan. 17, 2024, all pages.

JP2022-113679—Decision of Refusal (Translated), JPO, Jan. 17, 2024, all pages.

JP2022-113679—Notice of Reasons for Refusal (Original), JPO, Aug. 8, 2023, all pages.

JP2022-113679—Notice of Reasons for Refusal (Translated), JPO, Aug. 8, 2023, all pages.

Costantini, Stefania (Italy), Learning by Knowledge Exchange in Logical Agents, WOA 2005, Jan. 2005, ResearchGate pub'n No. 220866181, Nov. 12, 2015. whole document.

\* cited by examiner

METHOD OF KNOWLEDGE SHARING AMONG DIALOGUE SYSTEMS, DIALOGUE METHOD AND DEVICE

CROSS-REFERENCE TO RELATED APPLICATIONS

The present application claims the priority of the International patent application No. PCT/CN2019/087808 filed with the WIPO on May 21, 2019 and entitled "METHOD FOR SHARING KNOWLEDGE BETWEEN DIALOG SYSTEMS, AND DIALOG METHOD AND apparatus" and the Chinese patent application No. 201810536554.1 filed with the CNIPA on May 30, 2018 and entitled "METHOD OF KNOWLEDGE SHARING AMONG DIALOGUE SYSTEMS, AND DIALOGUE METHOD AND DEVICE", the entire content of each of which is incorporated herein by reference.

TECHNICAL FIELD

The present application relates to the field of artificial intelligence technique, and in particular to a method of knowledge sharing among dialogue systems, a dialogue method and device, an electronic device, and a storage medium.

BACKGROUND

A dialogue system, which may be a WeChat official account, a physical robot, a web dialogue robot, or an application on a computer, a mobile phone or other mobile device, can be used in various business areas. For example, A webpage dialogue robot may be used for business cooperation, technology development, or technical consultation. Knowledge points contained in a background knowledge base corresponding to web dialogue robots of different business directions are organized around their respective business directions and fields, so that the resulting web dialogue robots may become "experts" in their respective business directions. However, the disadvantage is that when a user asks a question during a chat with a webpage dialogue robot that exceeds the knowledge points covered by the current dialogue robot's knowledge base, the user cannot get an answer, or just get a wrong answer to this question, which brings poor experience to the user.

In order to solve this problem, it is presented in the prior art to integrate as many business direction knowledge points as possible to form a comprehensive knowledge base, and trains and constructs a super web dialogue robot that can answer questions in as many business directions as possible.

However, the inventor found that the above-mentioned prior art actually increases the cost of constructing a webpage dialogue robot and also causes a waste of resources. The reason is that in practical applications, users who are in a process of dialogue with the web dialogue robot of a certain business direction rarely ask questions beyond the scope of knowledge points of that business direction. Therefore, to integrate knowledge points of all possible business areas so as to cope with occurrence of such a small probability event has low utilization rate and thus causes a waste of resources. In addition, since a larger amount of data is required for training, not only the difficulty of training, but also the cost of training is increased.

SUMMARY

According to embodiments of the present application, a method and device of sharing knowledge among dialogue systems, a dialogue method, an electronic device, and a storage medium are provided for solving at least one of the above technical problems.

In a first aspect, embodiments of the present application provide a method of knowledge sharing among dialogue systems which is applied to an electronic device, and the method includes:

receiving, by a first dialogue system, a knowledge sharing request sent by an external dialogue system, wherein the knowledge sharing request comprises at least feature information of a knowledge point to be shared by the external dialogue system;

parsing the knowledge sharing request to determine the feature information of the knowledge point to be shared; and adding the feature information of the knowledge point to be shared to a knowledge base of the first dialogue system to form a shared knowledge base.

In a second aspect, embodiments of the present application provide a dialogue method for a first dialogue system to which a knowledge point is shared by at least one external dialogue system. A knowledge base of the first dialogue system and the knowledge point shared by the at least one external dialogue system with the first dialogue system constitute a shared knowledge base. The method includes:

parsing a question submitted by a user;

searching for an answer corresponding to the question in the shared knowledge base according to a result of the parsing;

when no answer is found by the search from the shared knowledge base, notifying the user that there is no answer corresponding to the question when;

when a unique answer is found by the search from the shared knowledge base, presenting the unique answer to the user; and when a plurality of answers is found by the search from the shared knowledge base, determining a priority of each answer and presenting an answer with the highest priority to the user.

In a third aspect, embodiments of the present application provide a device for sharing knowledge among dialogue systems, including:

an information receiving program module configured to receive a knowledge sharing request sent by an external dialogue system, wherein the knowledge sharing request comprises at least feature information of the knowledge point to be shared by the external dialogue system;

an information parsing program module configured to parse the knowledge sharing request to determine the feature information of the knowledge point to be shared; and a base updating program module configured to add the feature information of the knowledge point to be shared to a knowledge base of the first dialogue system to form a shared knowledge base.

In a fourth aspect, embodiments of the present application provide a dialogue device for a first dialogue system to which a knowledge point is shared by at least one external dialogue system. A knowledge base of the first dialogue system and the knowledge point of at least one external dialogue system shared with the first dialogue system constitute a shared knowledge base. The device includes:

a semantic parsing program module configured to parse a question submitted by a user;

an answer search program module configured to search for an answer corresponding to the question in the shared knowledge base according to a result of the parsing;

a first answering program module configured to, when the search indicates that there is no answer corresponding to the question in the shared knowledge base, notify the user that there is no answer;

a second answering program module configured to, when the search indicates that there is a unique answer in the shared knowledge base, present the unique answer to the user; and a third answering program module configured to, when the search indicates that there is a plurality of answers in the shared knowledge base, determine respective priorities of the plurality of answers to present an answer with the highest priority to the user.

In a fifth aspect, embodiments of the present application provide a non-volatile computer-readable storage medium which stores one or more programs including execution instructions. The execution instructions may be read and executed by an electronic device (including but not limited to computers, servers, or network devices, etc.) to execute the method of sharing knowledge among dialogue systems (or the dialogue method) described in any of the above.

In a sixth aspect, an electronic device is provided, including at least one processor and a memory communicatively connected with the at least one processor. The memory stores instructions executable by the at least one processor to implement the method of knowledge sharing (or the dialogue method) between dialogue systems described in any of the above of the present application.

In a seventh aspect, embodiments of the present application provide a computer program product which includes a computer program stored in a non-volatile computer-readable storage medium. The computer program includes program instructions which, when executed by a computer, enable the computer to implement the method of knowledge sharing (or the dialogue method) among dialogue systems described in any of the above.

The embodiments of the present application realizes the sharing of knowledge among dialogue systems by sharing knowledge points among dialogue systems, which can meet the cross-field dialogue needs from users to dialogue robots to the greatest extent while minimizing costs.

BRIEF DESCRIPTION OF THE DRAWINGS

In order to more clearly explain the technical solutions of the embodiments of the present invention, drawings necessary in the description of the embodiments will be described below. Obviously, the drawings in the following description are some embodiments of the present invention. Those skilled in the art can obtain other drawings based on these drawings without inventive effort.

DETAILED DESCRIPTION

To make the objects, technical solutions, and advantages of the embodiments of the present invention clearer, the technical solutions in the embodiments of the present invention will be described clearly and completely in conjunction with the drawings in the embodiments of the present invention. Obviously, the described are merely some but not all of the embodiments of the present invention. Based on the embodiments of the present invention, all other embodiments obtained by ordinary skilled in the art without inventive efforts shall fall within the scope of the present invention.

It should be noted that the embodiments in the present application and the features in these embodiments can be combined with each other without conflict.

The present invention can be described in the general context of computer-executable instructions such as program modules executed by a computer. Generally, program modules include routines, programs, objects, elements, and data structures, etc. that perform specific tasks or implement specific abstract data types. The present invention can also be practiced in distributed computing environments in which tasks are performed by remote processing devices connected through a communication network. In a distributed computing environment, program modules may be located in local and remote computer storage media including storage devices.

In the present invention, "module", "means", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

Figure 1:
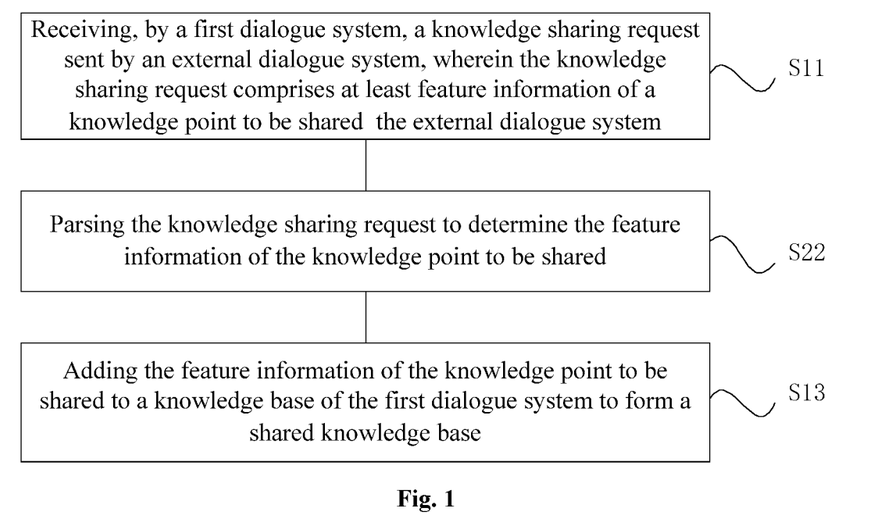
FIG. 1 is a flowchart of an embodiment of a method of knowledge sharing between dialogue systems according to the present application.

As shown in FIG. 1, according to an embodiment of the present application, a method of knowledge sharing between dialogue systems is provided, which is applicable to various electronic devices with a display screen and supporting human-computer interaction, such as desktop computers, laptop portable computers, smart phones, tablet computers, etc. When the electronic device executes the method of knowledge sharing among dialogue systems according to embodiments of the present application, the following steps are performed.

In step S11, a first dialogue system receives a knowledge sharing request sent by an external dialogue system. The request includes at least the feature information of a knowledge point to be shared of the external dialogue system.

Knowledge sharing among dialogue systems may be carried out within a certain group or with everyone. For example, for a company-wide dialogue system X, members of the company have their own dialogue systems A, B, C, etc. After the dialogue systems A, B, and C share their knowledge with X, a dialogue in X may include members X, A, B, C, etc.

In this embodiment, the first dialogue system may be the dialogue system X, and the external dialogue system may include the dialogue system A, the dialogue system B, and the dialogue system C.

The dialogue system X has its own knowledge set $K_x=\{q_{x1}, q_{x2}, \ldots q_{xn}\}$.

The dialogue system A has its own knowledge set $K_a=\{q_{a1}, q_{a2}, \ldots q_{ar}\}$.

The dialogue system B has its own knowledge set $K_b=\{q_{b1}, q_{b2}, \ldots q_{bs}\}$.

The dialogue system C has its own knowledge set $K_c=\{q_{c1}, q_{c2}, \ldots q_{ct}\}$.

Each knowledge set consists of a set of knowledge points q, and a knowledge point may be a question-and-answer pair or a triple in a knowledge graph.

The dialogue systems A, B, and C may share part of their knowledge points to the dialogue system X as knowledge points to be shared. For example, the dialogue systems A, B, and C respectively share their knowledge sub-sets $P_a$, $P_b$, and $P_c$ with the dialogue system X. The knowledge set of the dialogue system X becomes $K_x'=\{K_x, P_a, P_b, P_c\}$. Each knowledge point is associated with an original dialogue system to which it belongs (for example, knowledge points in the knowledge sub-set $P_a$ are associated with the dialogue system A), so that the dialogue system X may answer all questions corresponding to the knowledge points in the knowledge set $K_x'$.

The feature information of the knowledge point to be shared may be a feature vector or ID information corresponding thereto, no limitation in this respect is required in the present application.

A corresponding reward is given to a dialogue system sharing a knowledge point according to a use frequency of the knowledge point. The reward is a score of the dialogue system, which may be points, level or corresponding material reward of the dialogue system.

In S12, the knowledge sharing request is parsed to determine the feature information of the knowledge point to be shared.

In step S13, the feature information of the knowledge point to be shared is added to a knowledge base of the first dialogue system to form a shared knowledge base.

The embodiment of the present application realizes knowledge sharing among different dialogue systems by sharing knowledge points among dialogue systems, so that the first dialogue system may answer users' cross-domain questions (i.e., beyond its own knowledge domain), and meet the cross-domain dialogue needs of the users for dialogue robots to the greatest extent while minimizing costs. The dialogue system involved in the embodiment of the present application may be one or more among WeChat official account, web dialogue robot or application program in physical robot, computer, mobile phone or other mobile devices.

Based on the method according to the embodiment of the present application, knowledge may be shared among dialogue systems. The form of knowledge may be question-and-answer pairs, knowledge bases or knowledge graphs, and dialogue generation algorithms obtained by machine learning methods. For example, a dialogue system A has its own knowledge set and may share its knowledge with a dialogue system B so that the dialogue system B may answer all questions corresponding to the knowledge in the dialogue system A and the dialogue system B.

The shared knowledge may be conducted in dialogues with different roles. For example, the dialogue system A may share its knowledge with the dialogue system B, so that a dialogue in system B may have two members: dialogue system A and dialogue system B (as well as a terminal user), and may be shown as three members in an actual dialogue interface, two of which are dialogue system members and one is user member.

In some embodiments, the first dialogue system also receives configuration information of the external dialogue system. The configuration information includes at least avatar setting information of the external dialogue system, which is used to display an avatar of the external dialogue system on a dialogue interface when the first dialogue system answers questions involving the knowledge points of the external dialogue system. In this embodiment, when a knowledge point is shared, the configuration information of the corresponding external dialogue system is also shared with the first dialogue system, so that when there are questions beyond the scope of the knowledge points of the first dialogue system in an actual dialogue, not only an answer may be acquired from the knowledge points of the external dialogue system, but also the avatar information of the external dialogue system that provides the answer may be presented as a third party. In this way, to a certain extent, it may remind the user that the question currently mentioned has actually involved the knowledge category of another business direction. This may function to some extent in guiding and regulating users' recognition of the field tow which knowledge belongs.

In some embodiments, the knowledge sharing request further includes associated information of the knowledge point to be shared, which is used to determine a priority of the knowledge point to be shared. The associated information includes:

number of times (a) the knowledge point to be shared is adopted, and/or points (b) of the external dialogue system corresponding to the knowledge point to be shared, and/or a sharing type of the knowledge point to be shared. The sharing type includes: sharing to a specific dialogue system type ($c_1$), sharing to a specific dialogue system group type ($c_2$), and sharing to all external dialogue system types ($c_3$).

In this embodiment, a weighted sum of respective function values of parameters a, b, and $c_1$-$c_3$ may be used as a synthetic score (w) of the knowledge point to be shared to determine a priority thereof. The larger w is, the higher the priority.

For example, $w=n_1/f_1(a)+n_2 f_2(b)+n_3 f_3(m_1*c_1+m_2*c_2+m_3*c_3)$, where $n_1 \sim n_3$ can be 0 or 1, respectively, one of $m_1 \sim m_3$ can be a value of 1 with the other two being a value of 0.

Alternatively, the value of w is obtained through machine learning algorithms such as logistic regression and neural network.

For example, $w=1/(1+e^{-z})$, where $z=n_1a+n_2b+m_1c_1+m_2c_2+m_3c_3$. Values of parameters $n_1$, $n_2$, $m_1$, $m_2$, and $m_3$ may be obtained by training and fitting a large amount of user data.

Regarding the number of times the answer (that is, the knowledge point to be shared) is adopted, whether the answer is adopted may be determined by whether the dialogue continues after the answer is recommended in the dialogue process, or whether there is a further dialogue for the answer or with the answer provider. Each time the answer is adopted, a count is increased by one. The more the answer is accepted, the greater the probability that the answer will be accepted by the user. The greater the number of times the answer is adopted, the higher the priority of the answer.

Regarding the points of the dialogue system of which the answer is adopted, each dialogue system has points based on historical performance of serving users. It is defined that the better the historical performance, the greater the points. In this embodiment, it is defined that the greater the points, the higher the priority of the answer belonging to the dialogue system.

The priority of the knowledge point is determined according to its source. The priority is ranked from high to low as follows: the knowledge point of the first dialogue system, the knowledge point that is specifically to be shared to the specific dialogue system, the knowledge point that is specifically to be shared to the specific dialogue system group, and the knowledge point that is shared to all external dialogue systems. The greater the sharing scope of the knowledge point, the lower the priority weight.

In the embodiment of the present application, since a plurality of external dialogue systems may share knowledge points with a first dialogue system simultaneously, a question asked by a user may have a plurality of answers hit, and the plurality of answers correspond to a plurality of knowledge points of a plurality of dialogue systems (the first dialogue system and/or the external dialogue systems). In this case, based on the method of this embodiment, the plurality of answers may be sorted according to priority, so as to recommend the best answer to the user. Specifically, an answer with the highest priority may be directly presented in the dialogue interface, or several answers with higher priority may be presented in the dialogue interface simultaneously for the user to choose. The purpose of setting priority is to solve the problem of using duplicate knowledge, avoid blind sharing, and improve user experience.

The sharing function provided by the dialogue system is equivalent to allowing the original private knowledge to be shared, lowering the threshold for establishing a dialogue system and improving the ability of the dialogue system. Certain social skills are provided to the dialogue system. After knowledge sharing, when the knowledge point is asked again, it may be displayed in the form of multi-person dialogue.

In some embodiments, a dialogue method for a first dialogue system is also provided according to the present application. The dialogue system may be implemented as a software product or a hardware product (an electronic device) loading the software product. The first dialogue system is shared by at least one external dialogue system knowledge points thereof. A knowledge base of the first dialogue system and the knowledge point of the at least one external dialogue system shared with the first dialogue system constitute a shared knowledge base.

Figure 2:
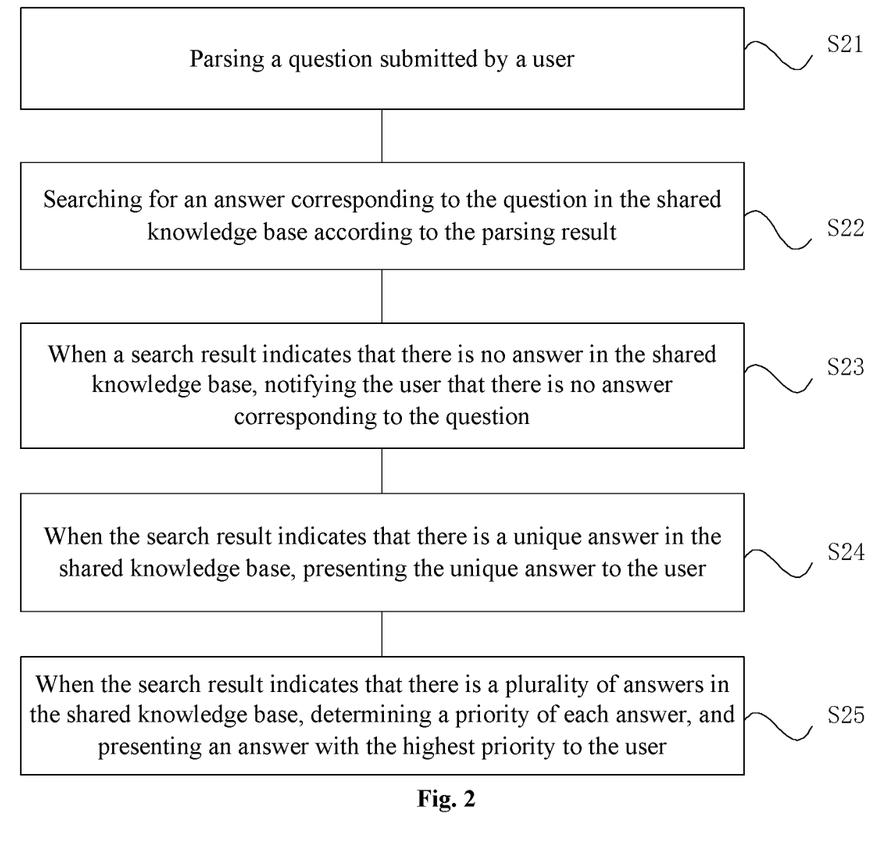
FIG. 2 is a flowchart of an embodiment of a dialogue method according to the present application.

As shown in FIG. 2, in some embodiments, the following steps are performed when the first dialogue system carries out the dialogue method according to the present application:

In step S21, a question submitted by a user is parsed. Specifically, the question submitted by the user is semantically interpreted to determine the intention of the user's question and search for a corresponding answer.

In step S22, an answer corresponding to the question is searched in the shared knowledge base according to a result of the parsing.

In step S23, when a search result indicates that there is no answer in the shared knowledge base, the user is notified that there is no answer corresponding to the question.

In step S24, when the search result indicates that there is a unique answer in the shared knowledge base, the unique answer is presented to the user.

In step S25, when the search result indicates that there is a plurality of answers in the shared knowledge base, a priority of each answer is determined, and an answer with the highest priority is presented to the user. Determining a priority of each answer includes:

determining a knowledge point corresponding to each of the plurality of answers;

acquiring associated information of the knowledge point corresponding to each answer, including a number of times the knowledge point corresponding to each answer is adopted, and/or points of an external dialogue system corresponding to the knowledge point corresponding to each answer, and/or attributes of the knowledge point corresponding to each answer, including local knowledge point type and sharing type, in which the sharing type includes shared to a specific dialogue system type, shared to a specific dialogue system group type, and shared to all external dialogue system types; and determining a priority of each answer based on the associated information.

The dialogue method according to the embodiment of the present application realizes mutual supplement of knowledge points among dialogue systems based on a shared knowledge base between a first dialogue system and an external dialogue system, so that users may acquire knowledge points across business domains using one dialogue system. Therefore, while minimizing the construction cost of the dialogue system and avoiding the waste of resources, needs from various users for knowledge of different business domains are met in one dialogue system.

Figure 3:
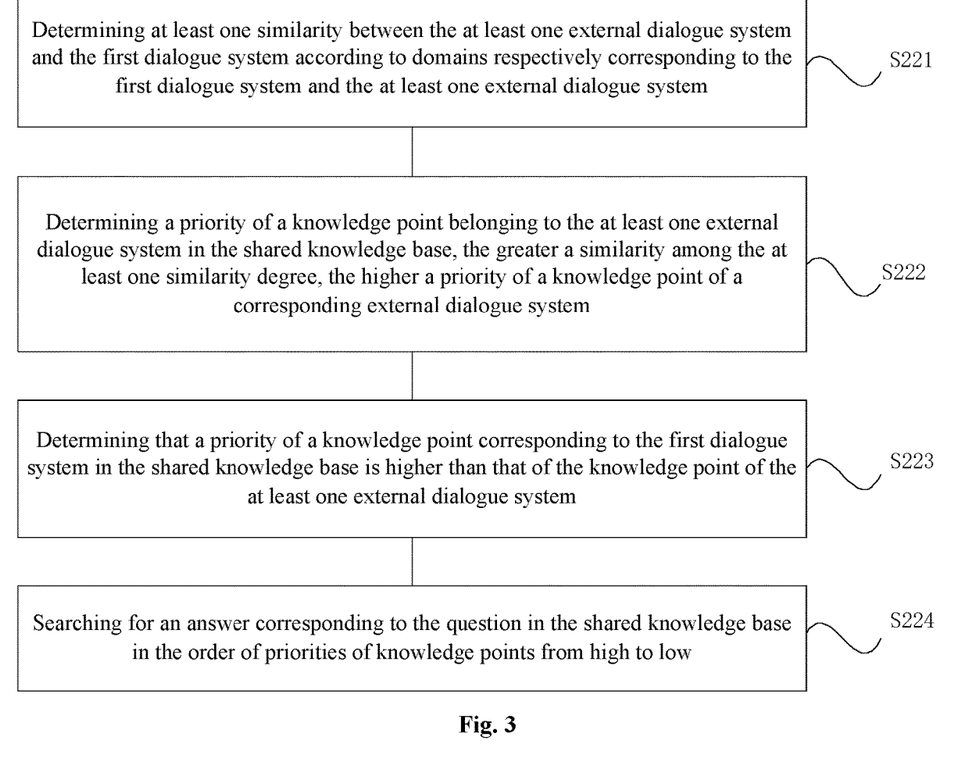
FIG. 3 is a flowchart of an embodiment of step S22 in FIG. 2.

As shown in FIG. 3, in some embodiments, searching for an answer to the question in the shared knowledge base according to a parsing result includes the following steps.

In step S221, at least one similarity between the at least one external dialogue system and the first dialogue system is determined respectively according to respective domains corresponding to the first dialogue system and the at least one external dialogue system.

In step S222, a priority of a knowledge point belonging to the at least one external dialogue system in the shared knowledge base is determined, and the greater of a similarity among the at least one similarity, the higher a priority of a knowledge point of a corresponding external dialogue system.

In step S223, it is determined that a priority of a knowledge point corresponding to the first dialogue system in the shared knowledge base is higher than that of the knowledge point of the at least one external dialogue system.

In step S224, an answer to the question is searched in the shared knowledge base in the order of priorities of the knowledge points from high to low.

By comparing the similarity between the domains of the external dialogue system and the first dialogue system, a distance relationship between the domains of the external dialogue system and the first dialogue system is determined, and the standard of the answer to the question asked by the user is defined, which avoids the waste of computing resources caused by blind search in the shared database, and at the same time improves the search efficiency, and may provide reference answers to users' questions within the shortest time. The fluency of the dialogue process is ensured and the user experience is improved.

In some embodiments, the dialogue method according to the present application further includes updating associated information of a knowledge point corresponding to the unique answer, specifically, the updating includes:

updating a number of times the knowledge point corresponding to the unique answer is adopted, and/or updating points of an external dialogue system corresponding to the knowledge point corresponding to the unique answer.

Through real-time updating of a number of times a knowledge point is adopted according to actual usage and corresponding scoring of a dialogue system, the accuracy of the data is ensured, thereby providing a reliable data source for evaluating a priority of the knowledge point, which is helpful to improve the accuracy of recommending an answer to a user.

It should be noted that the foregoing method embodiments are described as a series of actions for the sake of simple description, but those skilled in the art would know that the present invention is not limited by the sequence of actions described. Because according to the present invention, certain steps can be performed in other orders or simultaneously. Secondly, those skilled in the art would also know that the embodiments described in the specification are all preferred embodiments, and the involved actions are not necessarily required by the present invention.

In the above embodiments, the description of each embodiment has its own emphasis. For a part that is not detailed in an embodiment, reference can be made to the related descriptions of other embodiments.

Figure 4:
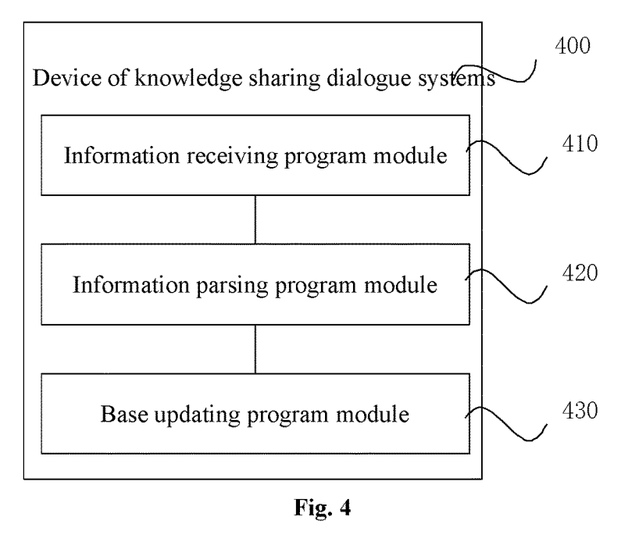
FIG. 4 is a schematic block diagram of an embodiment of a device of knowledge sharing between dialogue systems according to the present application.

As shown in FIG. 4, according to an embodiment of the present application, a device 400 for sharing knowledge among dialogue systems is provided, which is applicable to any types of dialogue systems for realizing knowledge sharing, the device 400 including:

an information receiving program module 410 configured to receive a knowledge sharing request sent by an external dialogue system, wherein the knowledge sharing request includes at least feature information of the knowledge point to be shared by the external dialogue system;

an information parsing program module 420 configured to parse the knowledge sharing request to determine the feature information of the knowledge point to be shared; and a base updating program module 430 configured to add the feature information of the knowledge point to be shared to a knowledge base of a first dialogue system to form a shared knowledge base.

Figure 5:
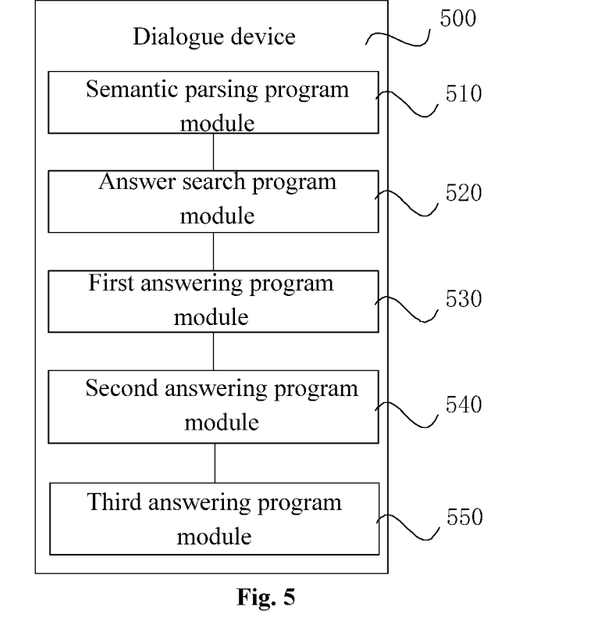
FIG. 5 is a functional block diagram of an embodiment of a dialogue device according to the present application.

As shown in FIG. 5, according to an embodiment of the present application, a dialogue device 500 for a first dialogue system is provided. The first dialogue system is shared a knowledge point by at least one external dialogue system. A knowledge base of the first dialogue system and knowledge points of the at least one external dialogue system shared to the first dialogue system constitute a shared knowledge base. The dialogue device includes:

a semantic parsing program module 510 configured to parse a question submitted by a user;

an answer search program module 520 configured to search for an answer corresponding to the question in the shared knowledge base according to a result of the parsing;

a first answering program module 530 configured to notify the user that there is no answer corresponding to the question when a search result indicates that there is no answer in the shared knowledge base;

a second answering program module 540 configured to, when the search result indicates that there is a unique answer in the shared knowledge base, present the unique answer to the user; and a third answering program module 550 configured to, when the search result indicates that there is a plurality of answers in the shared knowledge base, determine a priority of each answer and present an answer with the highest priority to the user.

Figure 6:
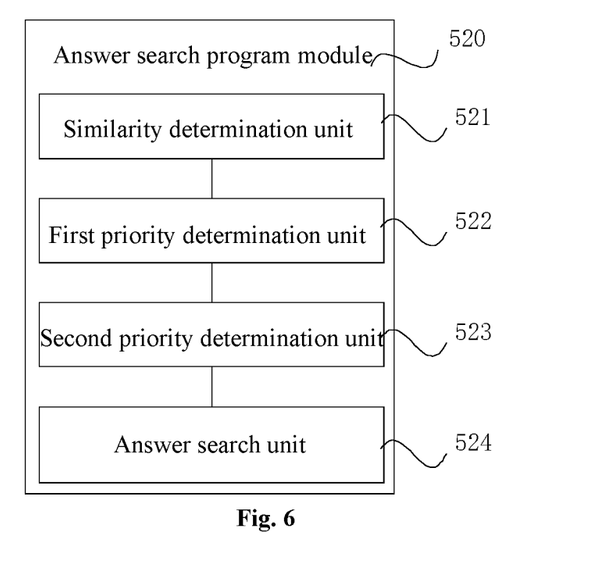
FIG. 6 is a functional block diagram of an embodiment of an answer search program module according to the present application.

As shown in FIG. 6, in some embodiments of the present application, the answer search program module 520 includes:

a similarity determination unit 521 configured to determine at least one similarity between the at least one external dialogue system and the first dialogue system according to domains to which the first dialogue system and the at least one external dialogue system respectively correspond;

a first priority determination unit 522 configured to determine a priority of a knowledge point belonging to the at least one external dialogue system in the shared knowledge base, the greater a similarity among the at least one similarity, the higher a priority of a knowledge point of a corresponding external dialogue system;

a second priority determination unit 523 configured to determine that a priority of a knowledge point belonging to the first dialogue system in the shared knowledge base is higher than that of the knowledge point of the at least one external dialogue system; and an answer search unit 524 configured to search for an answer corresponding to the question in the shared knowledge base in an order of priorities of knowledge points from high to low.

In some embodiments of the present invention, there is further provided a computer program product including a computer program stored in a non-volatile computer-readable storage medium, and the computer program includes program instructions which, when being executed by a computer, cause the computer to perform any one of the above-mentioned methods of knowledge sharing among dialogue systems (or dialogue methods).

In some embodiments of the present invention, there is further provided an electronic device including at least one processor and a memory communicatively connected to the at least one processor. The memory stores instructions executed by the at least one processor to cause the at least one processor to perform any one of the above-mentioned methods of knowledge sharing among dialogue systems (or dialogue methods).

In some embodiments of the present invention, there is further provided a storage medium in which a computer program is stored. The program is executed by a processor to perform any one of the above-mentioned methods of knowledge sharing among dialogue systems (or dialogue methods).

The device in the above embodiment of the present application may be used to execute the method in the embodiment of the present application, and correspondingly achieve the technical effect achieved by the method in the above embodiment of the present application, which will not be repeated here. In the embodiments of the present application, a hardware processor may be used to implement the corresponding functional modules.

Figure 7:
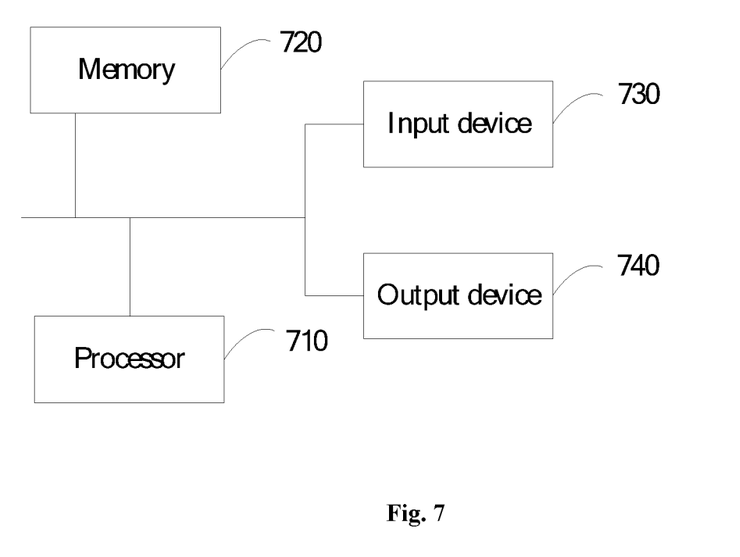
FIG. 7 is a schematic structural diagram of an embodiment of an electronic device according to the present application.

FIG. 7 is a schematic diagram of a hardware structure of an electronic device for performing a methods of knowledge sharing among dialogue systems (or dialogue methods) according to another embodiment of the present application. As shown in FIG. 7, the device includes one or more processors 710 and a memory 720, taking one processor 710 as an example.

The device for performing methods of knowledge sharing among dialogue systems (or dialogue methods) may further include an input means 730 and an output means 740.

The processor 710, the memory 720, the input means 730, and the output means 740 may be connected through a bus or in other ways. In FIG. 7, connection through a bus is used as an example.

The memory 720 is a non-volatile computer-readable storage medium, and can be used to store non-volatile software programs, non-volatile computer executable programs, and modules, such as program instructions/modules corresponding to the methods of knowledge sharing among dialogue systems (or dialogue methods) in the embodiments of the present application. The processor 710 performs various functional applications and data processing of a server by running the non-volatile software programs, instructions, and modules stored in the memory 720, that is, implementing the methods of knowledge sharing among dialogue systems (or dialogue methods) in the foregoing method embodiment.

The memory 720 may include a storage program area and a storage data area. The storage program area may store an operating system and application programs required by at least one function. The storage data area may store data generated according to the use of a knowledge sharing systems (or dialogue devices) and the like. In addition, the memory 720 may include a high-speed random access memory, and may also include a non-volatile memory, such as at least one magnetic disk storage device, a flash memory device, or other non-volatile solid-state storage devices. In some embodiments, the memory 720 may optionally include memories remotely disposed with respect to the processor 710, and these remote memories may be connected to knowledge sharing systems (or dialogue devices) through a network. Examples of the above network include but are not limited to the Internet, intranet, local area network, mobile communication network, and combinations thereof.

The input means 730 can receive input digital or character information, and generate signals related to user settings and function control of the knowledge sharing systems (or dialogue devices). The output means 740 may include a display device such as a display screen.

The one or more modules are stored in the memory 720, and when executed by the one or more processors 710, perform the methods of knowledge sharing among dialogue systems (or dialogue methods) in any of the above method embodiments.

The above-mentioned products can perform the method according to the embodiments of the present application, and have corresponding function modules and beneficial effects for performing the method. For technical details that are not described in detail in this embodiment, reference may be made to the method provided in the embodiments of the present application.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices;

(4) Server providing computing services and including a processor, hard disk, memory, system bus, etc., with a similar architecture to a general-purpose computer but a higher processing power and stability, reliability, security, scalability, manageability and for providing highly reliable services; and (5) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

What is claimed is:

1. A computer-implemented method of knowledge sharing among dialogue systems, comprising the steps of:

receiving, by a first dialogue system, a knowledge sharing request sent by an external dialogue system comprising
        (i) at least feature information of a knowledge point to be shared by the external dialogue system, where the knowledge point to be shared comprises a question-and-answer pair or a triple-in-a-knowledge-graph;

and (ii) configuration information of the external dialogue system comprising at least avatar setting information of the external dialogue system;

parsing, by the first dialogue system, the knowledge sharing request to determine the feature information of the knowledge point to be shared, wherein the feature information of the knowledge point to be shared are feature vectors or ID information corresponding to the knowledge point;

adding, by the first dialogue system, the feature information of the knowledge point to be shared to a knowledge base of the first dialogue system to form a shared knowledge base; and determining, by the first dialogue system, a priority of the knowledge point within the shared knowledge base according to its source, its sharing type, and through machine learning algorithms comprising logistic regression, neural networks, or both; and, displaying, by the first dialogue system, an avatar of the external dialogue system on a dialogue interface when the first dialogue system answers a question involving the knowledge point of the external dialogue system;

and wherein the first dialogue system and the external dialogue system belong to different domains.

2. The method according to claim 1, wherein the knowledge sharing request further comprises information associated with the knowledge point to be shared for determining the priority of the knowledge point to be shared, and the associated information comprises:

a number of times the knowledge point to be shared is adopted by other dialogue systems, and/or points of an external dialogue system corresponding to the knowledge point to be shared, and/or a sharing type of the knowledge point to be shared, wherein the sharing type comprises:

shared to a specific dialogue system, shared to a specific dialogue system group, and shared to all external dialogue systems.

3. An electronic device for a first dialogue system, comprising:

at least one processor and a memory communicatively connected to the at least one processor, wherein the memory stores instructions executable by the at least one processor, and wherein execution of the instructions by the at least one processor causes the at least one processor to perform the steps of:

parsing a question submitted by a user to obtain a parsing result;

searching for an answer corresponding to the question in a shared knowledge base according to the parsing result;

when said searching finds no answer in the shared knowledge base, notifying the user that there is no answer corresponding to the question;

when said searching finds a unique answer in the shared knowledge base, presenting the unique answer to the user;

when said searching finds a plurality of answers in the shared knowledge base, determining a priority of each answer, and presenting an answer with the highest priority to the user; and when the first dialogue system answers a question involving the knowledge point of an external dialogue system, displaying an avatar of the external dialogue system on a dialogue interfacel, wherein said first dialogue system and the external dialogue system belong to different domains, and wherein the shared knowledge base is constituted by a knowledge base of the first dialogue system and a knowledge point of the external dialogue system, which it has shared with the first dialogue system, according to the method comprising the steps of:

receiving, by the first dialogue system, a knowledge sharing request sent by the external dialogue system comprising at least feature information of the knowledge point to be shared by the external dialogue system, and configuration information of the external dialogue system comprising at least avatar setting information of the external dialogue system;

parsing, by the first dialogue system, the knowledge sharing request to determine the feature information of the knowledge point to be shared;

adding, by the first dialogue system, the feature information of the knowledge point to be shared to a knowledge base of the first dialogue system to form the shared knowledge base; and determining, by the first dialogue system, a priority of the knowledge point of the external dialogue system according to its source and sharing type, and through machine learning algorithms comprising logistic regression, neural networks, or both.

4. The electronic device according to claim 3, wherein searching for an answer corresponding to the question in the shared knowledge base according to the parsing result comprises:

determining at least one similarity between the at least one external dialogue system and the first dialogue system respectively according to domains the first dialogue system and the at least one external dialogue system respectively correspond to;

determining a priority of a knowledge point belonging to the at least one external dialogue system in the shared knowledge base, the greater a similarity among the at least one similarity degree, the higher a priority of a knowledge point of a corresponding external dialogue system;

determining that a priority of a knowledge point corresponding to the first dialogue system in the shared knowledge base is higher than that of the knowledge point of the at least one external dialogue system; and searching for an answer corresponding to the question in the shared knowledge base in the order of priorities of knowledge points from high to low.

5. The electronic device according to claim 3, wherein determining the priority of each answer comprises:

determining a knowledge point corresponding to each of the plurality of answers;

acquiring associated information of the knowledge point corresponding to each answer, wherein the associated information comprises:

a number of times the knowledge point corresponding to each answer is adopted by other dialogue systems, and/or points of an external dialogue system corresponding to the knowledge point corresponding to each answer, and/or attributes of the knowledge point corresponding to each answer, wherein the attributes comprise a local knowledge point type and a sharing type, and the sharing type comprises: shared to a specific dialogue system, shared to a specific dialogue system group, and shared to all external dialogue systems; and determining respective priorities of the plurality of answers according to the associated information.

6. The electronic device according to claim 5, wherein the at least one processor further performs a step of updating associated information of a knowledge point corresponding to the unique answer, wherein the updating comprises:
updating a number of times the knowledge point corresponding to the unique answer is adopted by other dialogue systems, and/or
updating points of an external dialogue system corresponding to the knowledge point corresponding to the unique answer.

7. The electronic device according to claim 3, wherein the knowledge sharing request further comprises information associated with the knowledge point to be shared for determining the priority of the knowledge point to be shared, and the associated information comprises:
a number of times the knowledge point to be shared is adopted by other dialogue systems, and/or
points of an external dialogue system corresponding to the knowledge point to be shared, and/or
a sharing type of the knowledge point to be shared, wherein the sharing type comprises shared to a specific dialogue system, shared to a specific dialogue system group, and shared to all external dialogue systems.

8. The electronic device according to claim 7, wherein searching for an answer corresponding to the question in the shared knowledge base according to the parsing result comprises:
determining at least one similarity between the at least one external dialogue system and the first dialogue system respectively according to domains the first dialogue system and the at least one external dialogue system respectively correspond to;
determining a priority of a knowledge point belonging to the at least one external dialogue system in the shared knowledge base, the greater a similarity among the at least one similarity degree, the higher a priority of a knowledge point of a corresponding external dialogue system;
determining that a priority of a knowledge point corresponding to the first dialogue system in the shared knowledge base is higher than that of the knowledge point of the at least one external dialogue system; and
searching for an answer corresponding to the question in the shared knowledge base in the order of priorities of knowledge points from high to low.

9. The electronic device according to claim 7, wherein determining the priority of each answer comprises:
determining a knowledge point corresponding to each of the plurality of answers;
acquiring associated information of the knowledge point corresponding to each answer, wherein the associated information comprises:
a number of times the knowledge point corresponding to each answer is adopted by other dialogue systems, and/or
points of an external dialogue system corresponding to the knowledge point corresponding to each answer, and/or
attributes of the knowledge point corresponding to each answer, wherein the attributes comprise a local knowledge point type and a sharing type, and the sharing type comprises: shared to a specific dialogue system, shared to a specific dialogue system group, and shared to all external dialogue system; and
determining respective priorities of the plurality of answers according to the associated information.

10. The electronic device according to claim 9, wherein the at least one processor further performs a step of updating associated information of a knowledge point corresponding to the unique answer, which comprises:
updating a number of times the knowledge point corresponding to the unique answer is adopted by other dialogue systems, and/or
updating points of an external dialogue system corresponding to the knowledge point corresponding to the unique answer.

11. An electronic device comprising:
at least one processor and a memory communicatively connected to the at least one processor, wherein the memory stores instructions executable by the at least one processor to perform the steps of:
receiving, by a first dialogue system, a knowledge sharing request sent by an external dialogue system comprising at least feature information of a knowledge point to be shared by the external dialogue system, where said feature information of the knowledge point to be shared are feature vectors or ID information corresponding to the knowledge point; and configuration information of the external dialogue system comprising at least avatar setting information of the external dialogue system, where the first dialogue system and the external dialogue system belong to different domains;
parsing, by the first dialogue system, the knowledge sharing request to determine the feature information of the knowledge point to be shared;
adding the feature information of the knowledge point to be shared to a knowledge base of the first dialogue system to form a shared knowledge base;
determining, by the first dialogue system, a priority of the knowledge point within the shared knowledge base according to its source, its sharing type, and through machine learning algorithms comprising logistic regression, neural networks, or both; and
displaying an avatar of the external dialogue system on a dialogue interface when the first dialogue system answers a question involving the knowledge point of the external dialogue system.

12. The electronic device according to claim 11, wherein the knowledge sharing request further comprises information associated with the knowledge point to be shared for determining the priority of the knowledge point to be shared, and the associated information comprises:
a number of times the knowledge point to be shared is adopted by other dialogue systems, and/or
points of an external dialogue system corresponding to the knowledge point to be shared, and/or
a sharing type of the knowledge point to be shared, wherein the sharing type comprises shared to a specific dialogue system, shared to a specific dialogue system group, and shared to all external dialogue systems.

* * * * *